Figure 1:
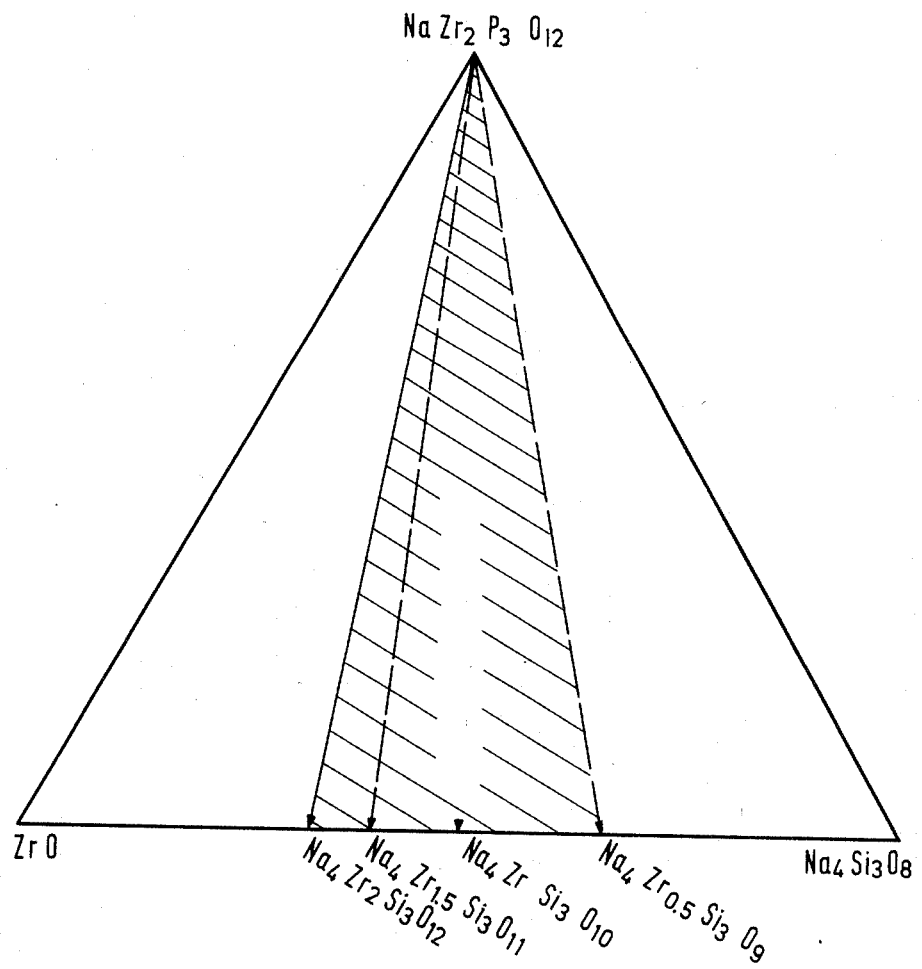

United States Patent [19]

Bell et al.

[11] Patent Number: 4,582,621

[45] Date of Patent: Apr. 15, 1986

[54] MIXED CRYSTALS, A METHOD FOR THEIR PREPARATION AND THEIR USE

[75] Inventors: Michael F. Bell, Kingston, Canada; Hans Höfer, Bergisch Gladbach, Fed. Rep. of Germany; Holger Diem, Mühlacker, Fed. Rep. of Germany; Ulrich von Alpen, Schlossborn, Fed. Rep. of Germany

[73] Assignees: Max-Planck-Gesellschaft zur Foerderung der Wissenschaften e.V., Gottingen; Varta Batterie AG, Hanover, both of Fed. Rep. of Germany

[21] Appl. No.: 297,465

[22] Filed: Aug. 28, 1981

[30] Foreign Application Priority Data

Sep. 1, 1980 [DE] Fed. Rep. of Germany ....... 3032894

[51] Int. Cl.$^4$ .............................................. H01M 6/18
[52] U.S. Cl. .................................. 252/62.2; 429/104; 429/193
[58] Field of Search ................ 429/104, 193; 252/62.2

[56] References Cited

U.S. PATENT DOCUMENTS

| | | | |
|---|---|---|---|
| 4,049,891 | 9/1977 | Hong et al. | 429/193 |
| 4,166,159 | 8/1979 | Pober | 429/193 |
| 4,237,200 | 12/1980 | Weddigen | 429/104 |
| 4,322,485 | 3/1982 | Harrison et al. | 252/62.2 |
| 4,394,280 | 7/1983 | von Alpen et al. | 429/191 |

FOREIGN PATENT DOCUMENTS 2006639  8/1970  Fed. Rep. of Germany ...... 252/622

Primary Examiner—John Doll
Assistant Examiner—Wayne A. Langel
Attorney, Agent, or Firm—Felfe & Lynch

[57] ABSTRACT

Mixed crystals of the general formula $$Na_{1+x}M_{2-\frac{4}{3}x+y}Si_xZ_{3-x}O_{12-\frac{8}{3}x+2y}$$

wherein

M represents one of the transition metals of the Fourth Group of the Periodic System, Zr, Ti, Hf or mixtures thereof, Z represents one of the elements of the Fifth Group of the Periodic System, P, Sb, Bi, V, Nb, Ta or mixtures thereof, and x represents a number from 0.01 to 3, and
y a number from 0 to 0.5, are new, and are suitable as ion-conducting electrolyte in electrochemical cells.

9 Claims, 3 Drawing Figures

MIXED CRYSTALS, A METHOD FOR THEIR PREPARATION AND THEIR USE

DESCRIPTION

The invention relates to new mixed crystals, a process for their production, and their use as solid ionically conductive electrolytes in an electrochemical cell.

The use of solid electrolytes of good ionic conduction in batteries, i.e., primary cells or secondary cells, is of considerable technical importance, inasmuch as, (1) with electronic partial conductivity at the vanishing point, solid electrolytes virtually prevent the self-discharge of the battery and thus give it a long shelf life, (2) since they are solids, their use in solid batteries avoids the sealing problem encountered in conventional cells using liquid electrolytes, and (3) they make possible the construction of high-temperature high-energy cells using molten electrodes and a solid separator.

The solid electrolytes that have been known hitherto and can be used for the above-named purpose, nevertheless leave much to be desired. To some extent their stability is unsatisfactory, especially at high temperatures, and to some extent their conductivity does not fully satisfy requirements.

The solid electrolytes which have acquired technical importance are particularly solid electrolytes on the basis of lithium compounds, such as lithium nitride, or of sodium compounds such as Na-$\beta$-alumina (Na$_2$O·11Al$_2$O$_3$) and the mixed crystal series Na$_{1+x}$Si$_x$Zr$_2$P$_{3-x}$O$_{12}$, in which x has a value from greater than 0 to 3, and which is known by the name of nasicon.

A new mixed crystal series has now been discovered, which is superior to nasicon in its stability and conductivity. In comparison with Na-$\beta$-alumina, the new series of substances is substantially easier to synthesize and has a high stability against moisture for a comparable conductivity.

The subject of the invention is therefore mixed crystals of the general formula

$$Na_{1+x}M_{2-\frac{4}{3}x+y}Si_xZ_{3-x}O_{12-\frac{8}{3}x+2y}$$

wherein M is one of the transition elements of the Fourth Group of the Periodic System, Zr, Ti, Hf or mixtures thereof, Z is one of the elements of the Fifth Group of the Periodic System, P, Sb, Bi, V, Nb, Ta or mixtures thereof, and x represents a number from 0.01 to 3 and y a number from 0 to 0.5.

The new compounds of the invention occur as mixed crystals in the crystal field defined by the quasi-binary sections NaZr$_2$P$_3$O$_{12}$—Na$_4$Zr$_{0.5}$Si$_3$O$_9$ and NaZr$_2$P$_3$O$_{12}$—Na$_4$Zr$_{1.5}$Si$_3$O$_{11}$. The likewise new marginal phases Na$_4$Zr$_{0.5}$Si$_3$O$_9$, Na$_4$ZrSi$_3$O$_{10}$ and Na$_4$Zr$_{1.5}$Si$_3$O$_{11}$ lie on the quasi-binary section between ZrO$_2$ and the formal compound Na$_4$Si$_3$O$_8$.

In the appended drawing, FIG. 1 shows the phase relationship for nasicon and the new mixed-crystal field of the invention in the range of existence of the three end members NaZr$_2$P$_3$O$_{12}$, ZrO$_2$ and the formal Na$_4$Si$_3$O$_8$.

The mixed crystals of the invention, however, can also be prepared in the quaternary system with the end members ZrO$_2$, P$_2$O$_5$, SiO$_2$ and Na$_2$O. The new mixed crystals of the invention exist in the range wherein x is from 0.01 to about 1.6 in the form of a rhombohedral compound obtainable in phase-pure form, in a manner similar to the known nasicon mixed crystal series, which, however, is known as not being phase-pure. In contrast to the nasicon system, however, the compounds of the invention are situated in the mixed crystal field given by x 1.5 and 0 y 0.5 as a monoclinic phase, including the marginal phases Na$_4$Zr$_{0.5}$Si$_3$O$_9$, Na$_4$ZrSi$_3$O$_{10}$ and Na$_4$Zr$_{1.5}$Si$_3$O$_{11}$, with a conductivity that is higher in comparison with the rhombohedral phase. These monoclinic mixed crystals can also be prepared in phase-pure form. Thus, the marginal phase Na$_4$ZrSi$_3$O$_{10}$ shows at high temperatures a considerable conductivity $\sigma$ which at 300° C., for example, amounts to $1.6 \times 10^{-3} \Omega^{-1}$ cm$^{-1}$. In comparison to the marginal phase x=3 in the nasicon mixed crystal system, the activation energy for ionic conduction is increased from 29 kJ per mole to 42 kJ per mole. In a graphic representation of the relationship between conductivity and temperature in the logarithmic system, the activation energy corresponds to the gradient of the straight lines obtained. This indicates that the activation energy at high cell operating temperatures should be as high as possible.

At room temperature the conductivity in the new mixed crystals of the invention is improved by a factor of 5 over the best conductivity figures on nasicon. It thus corresponds approximately to the conductivity of Na-$\beta$-alumina, without, however, the disadvantage of insufficient stability in a moist atmosphere which Na-$\beta$-alumina is known to have.

On the basis of their especially good conductivity characteristics, mixed crystals in accordance with the invention are preferred which have a monoclinic structure and a value x greater than 1.6. These preferred crystals are likewise monophasic and have a high degree of crystallization, which is also shown by the high density of tablets made therefrom (more than 98% of the theoretical density).

The new mixed crystals of the invention are, as already mentioned, very stable, particularly with respect to sodium which serves as an electrode when the crystals are used in a battery as solid electrolyte. In this regard, too, they are considerably superior to nasicon. The crystals under comparison were placed in the form of a sintered tablet in molten sodium at 350° C. for 18 and 20 days, respectively. On an electron microscope photograph of the surface of the nasicon tablet, the pits caused by a surface reaction between nasicon and molten sodium are plainly apparent.

A corresponding photograph of the mixed crystal of the invention shows no trace of attack visible within the resolution of the electron microscope, except for a slight discoloration. The mixed crystal of the invention in this case was Na$_{3.23}$Zr$_{1.48}$Si$_{2.23}$P$_{0.77}$O$_{10.96}$, with x=2.23 and y=0.23.

This shows that the mixed crystal of the invention is stable with molten sodium at the working temperature of the sodium-sulfur cell, for example, and achieves the conductivity properties of Na-$\beta$-alumina which are far better than those of nasicon.

Figure 2:
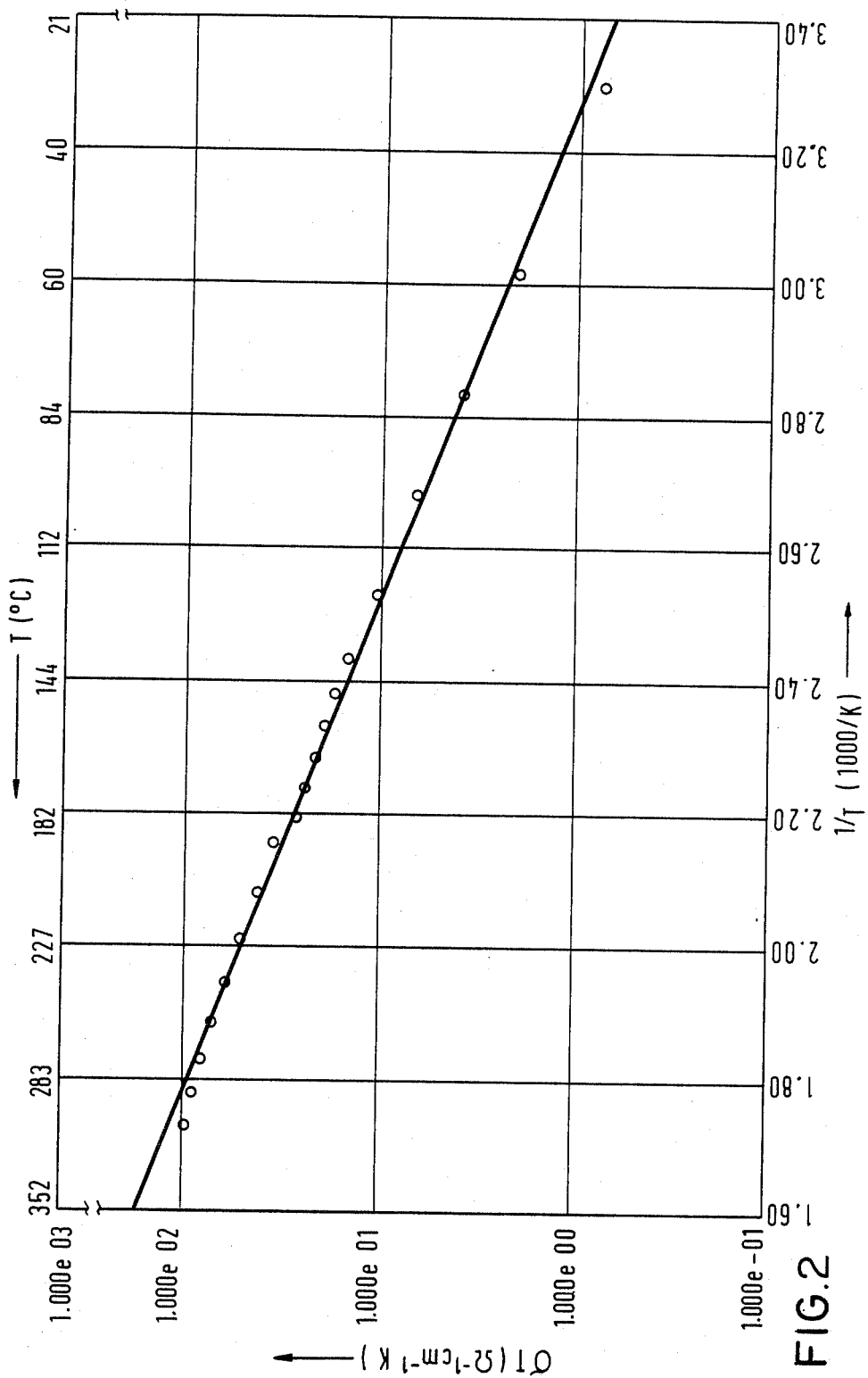

The conductivity of the mixed crystal of the invention with x=2.1 with respect to temperature is shown in FIG. 2 of the drawing, in the logarithmic system.

In the mixed crystal of the invention, M is preferably zirconium (Zr) or a mixture of Zr and Hf (commercial zirconium normally contains hafnium). The same properties, however, can also be obtained when M consists of titanium or hafnium, alone or in mixture with one another or with zirconium.

Z consists preferably of phosphorus, although the other elements of the Fifth Group of the Periodic System, which are stated above, can replace the phosphorus at least to some extent.

The method of the invention for preparing the new mixed crystals is characterized by calcining the components of the mixed crystals in finely powdered form (particle size less than 100 microns, in the molar proportions required for a particular desired composition, at a very high temperature, although avoiding the occurrence of a molten phase, doing so until the $ZO_2$ peak in the X-ray diagram is no longer visible, the calcining being interrupted one or more times as necessary for the purpose of again grinding the material fine.

Important in the method of the invention is the stoichiometric composition of the starting substances in accordance with the general formula of the mixed crystals of the invention, and the performance of a calcination until any $ZO_2$ phase, especially $ZrO_2$, has completely vanished, which can be followed in the X-ray diagram. At the same time, the occurrence of a molten phase must be prevented. On the other hand, however, the calcination is to take place at the highest possible temperature, since as the temperature rises, not only does the rate of formation of the mixed crystals increase, but also the phase purity of the product obtained is improved.

The elements M are used in the preparation process preferably in the form of their dioxides, for example in the form of $ZrO_2$. Alternatively, they can also be used in the form of organometallic compounds which degrade upon calcination, it being assumed that an especially finely divided and reactive dioxide forms in situ. Examples of suitable organometallic compounds are alkylates, aralkylates, acetylacetonates (e.g., $Zr(C_5H_7O_2)_4$) or other organic moieties such as those used also in the preparation of nasicon, for example.

Sodium is best used in the form of its oxide, carbonate or bicarbonate, or of a precursor which is transformed by heating to one of these compounds. Silicon is best used in the form of the dioxide, although silicates can also be used, which also can already contain the element M and sodium. The element of the Fifth Group of the Periodic System is used preferably as ammoniacate, for example as $NH_4H_2PO_4$ or corresponding antimonate, bismuthate, vanadate, niobate or tantalate.

As previously mentioned, the mixed crystals of the invention are ionically conductive solids. In accordance with the invention, therefore, they are used as solid ionically conductive electrolytes in an electrochemical cell, especially in high output temperature cells or room temperature cells as well as electrochromic indicators. Since they are distinguished especially by stability in contact with metallic sodium, they are used preferentially in electrochemical cells having an anode based on sodium or a sodium alloy.

The term, electrochemical cell, is to be understood herein to refer generally not only to batteries but also to other systems in which the ionically conductive properties of an electrolyte are technically utilized. The anode always contains sodium, but does not need to consist of it. In addition to sodium itself, sodium alloys or other electronically conductive substances are involved, such as sodium in a graphite matrix.

For the cathode, the same substances can be used which are known in conjunction with electrochemical cells containing an electrolyte of nasicon or Na-$\beta$-alumina.

The following table shows the conductivities of mixed crystals of the invention, in which M=Zr and Ti, and Z=P, for various values of x. The compound wherein x=0 serves for comparison and shows the abrupt change in the transition from this known compound to the series of mixed crystals of the invention with regard to conductivity characteristics.

TABLE

| | | Conductivities of this mixed crystal system | | |
|---|---|---|---|---|
| X | Y | 300 ($\Omega^{-1}cm^{-1}$) | 575 ($\Omega^{-1}cm^{-1}$) | $E_a$ eV |
| 0 | 0 | $5.0 \times 10^{-12}$ | $3.0 \times 10^{-6}$ | 0.76 |
| 0.5 | 0.05 | $5.4 \times 10^{-8}$ | $5.1 \times 10^{-4}$ | 0.53 |
| 1.0 | 0.10 | $5.5 \times 10^{-5}$ | $8.4 \times 10^{-3}$ | 0.32 |
| 1.2 | 0.12 | $7.3 \times 10^{-5}$ | $1.4 \times 10^{-2}$ | 0.32 |
| 1.6 | 0 | $4.6 \times 10^{-5}$ | $4.8 \times 10^{-2}$ | 0.41 |
| 2.0 | 0.2 | $2.2 \times 10^{-3}$ | $2.4 \times 10^{-1}$ | 0.34 |
| 2.2 | 0.2 | $1.0 \times 10^{-3}$ | $1.7 \times 10^{-1}$ | 0.31 |
| 2.4 | 0 | $1.2 \times 10^{-3}$ | $7.6 \times 10^{-2}$ | 0.30 |
| 3.0 | 0 | $1.0 \times 10^{-6}$ | $1.0 \times 10^{-4}$ | 0.40 |

The following examples further explain the invention.

EXAMPLE 1

Preparation of the mixed crystal of the invention wherein x=2.2 and y=0.183

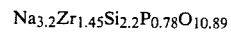

$Na_{3.2}Zr_{1.45}Si_{2.2}P_{0.78}O_{10.89}$

Amounts weighed in:
1.7 g: $Na_2CO_3$
7.07 g: $ZrC_{20}H_{28}O_8$
Total weighed in 10.84 g
1.32 g: $SiO_2$
0.90 g: $NH_4H_2PO_4$ The 10.84 g is mixed and ground in a micromill (ball diameter 70 mm) for one hour. Then the mixture is made into a compact (1″ diameter) and placed in a platinum crucible in a tubular furnace. Since the optimum sintering conditions depend on the composition of the mixed crystal, the compact is heated according to a heating program specific for its composition. The heating program used in the present case is based on DTA data determined in preliminary experiments, and comprises the following steps:

1 hour at 200° C.
2 hours at 600° C.
4 hours at 1000° C.
10 hours at 1200° C.

The end product is ground for one hour in the micromill (ball diameter 70 mm). The average grain size is less than 100 microns. The X-ray diagram shows a high degree of crystallization of the synthesis product. It can furthermore be perceived from the X-ray diagram that the solid reaction was entirely completed during the calcining process, because no phases occur other than the desired end compound. The product which is then in powder form can be compressed to form disk-shaped or tube-shaped ceramics. Then follows a sintering process at 1240° C. for 16 hours. The shaped end product has 98% of the theoretical density and performs in a porcelain-like manner.

If $ZrO_2$ is used as the zirconium donor instead of $ZrC_{20}H_{28}O_8$, the temperature and duration of the individual heating steps vary. Here again the optimum values are determined by preliminary DTA experiments. In some cases the calcining process has to be interrupted several times in order to mix the sample again in the micromill. The calcining process is complete when phase purity and a high degree of crystallization are found in the X-ray diagram.

EXAMPLE 2

Figure 3:
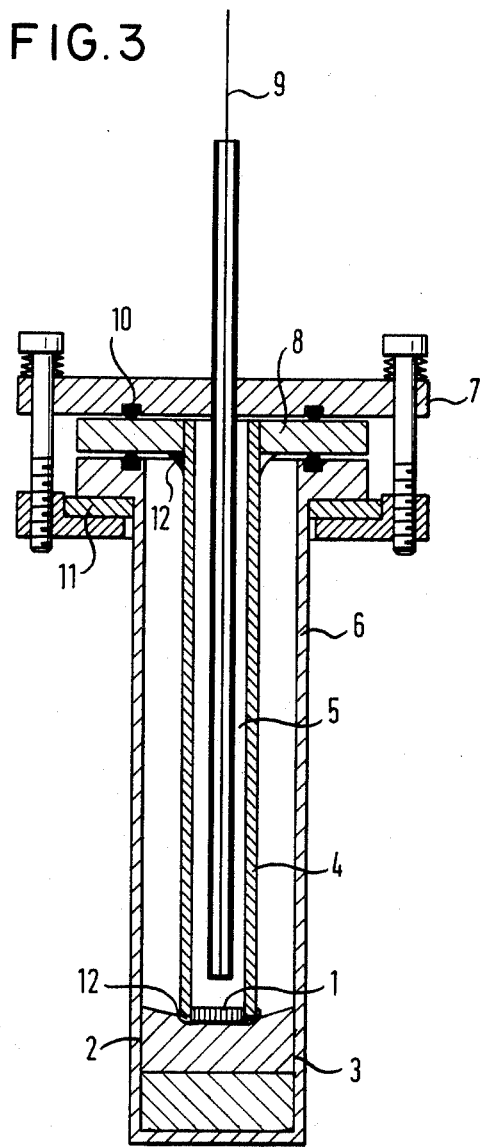

A study was made of the suitability of the mixed crystal obtained in tablet form in accordance with Example 1 as an electrolyte in a sodium-sulfur cell. For this purpose the tablet was placed in the battery represented in the drawing in FIG. 3, wherein: 1 represents the electrolyte tablet, 2 a carbon layer, 3 sulfur in graphite wool, 4 a corundum tube filled with sodium 5, 6 a tube of V4A steel as the positive output conductor, 7 a plate of V4A steel as the negative output conductor, 8 a corundum disk as insulator, 9 a temperature sensor, 10 an O-ring of aluminum, 11 a ring of Klingerit and 12 glass solder. The cell represented has a capacity of 5.77 ampere-hours.

We claim:

1. In mixed crystals of the four component system defined by the end members $Na_2O$, $MO_2$, $Z_2O_5$ and $SiO_2$,
wherein
   M represents one of the transition metals of the Fourth Group of the Periodic System, Zr, Ti, Hf or mixtures thereof, and
   Z represents one of the elements of the Fifth Group of the Periodic System, P, Sb, V, Nb, Ta or mixtures thereof,
the improvement wherein said crystals belong to a crystal field defined by the quasi-binary sections $NaM_2Z_3O_{12}$–$Na_4M_{0.5}Si_3O_9$ and $NaM_2Z_3O_{12}$–$Na_4M_{1.5}Si_3O_{11}$, and exclude compositions $NaM_2Z_3O_{12}$ to $Na_{1.01}M_{1.997}Si_{0.01}Z_{2.99}O_{11.98}$.

2. The mixed crystal of claim 1, wherein M is Zr or a mixture of Zr with Hf or Ti.

3. The mixed crystal of claim 1, wherein Z is P or a mixture of P, V, Nb, Ta, Bi or Sb.

4. The mixed crystal of claim 1, wherein sodium occurs unstoichiometrically in the mixed crystal lattice up to 20% and is electrostatically balanced by an oxygen deficiency or excess as required.

5. The mixed crystal of claim 1 wherein Z is P.

6. Method of preparing the mixed crystal of claim 1, comprising the steps of mixing together the components of the mixed crystal in finely powdered form in predetermined molar proportions for the mixed crystal and calcining the mixture of components at a temperature near the melting point but below the melting point to avoid the occurrence of a molten phase while following the reaction by monitoring the disappearance of $MO_2$ from the mixture, the reaction being complete with the disappearance of $MO_2$.

7. Method of claim 6, wherein M is introduced into the mixture in the form of $MO_2$ or in the form of an organometallic compound.

8. The method of claim 6 further comprising interrupting the calcining, grinding the mixture into a fine powder and thereafter continuing the calcining of the mixture.

9. The method of claim 6 wherein the disappearance of $MO_2$ is followed using X-ray diffraction diagrams of the mixture.

* * * * *